2,702,503

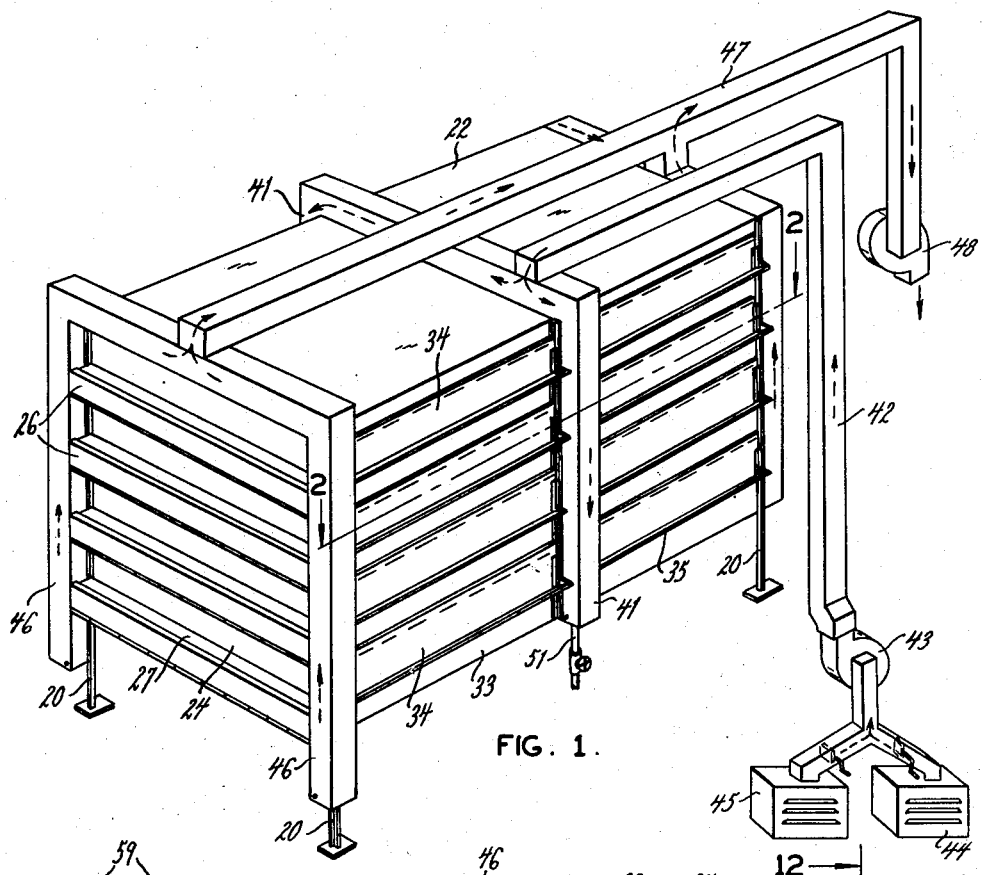
FIG. 1.
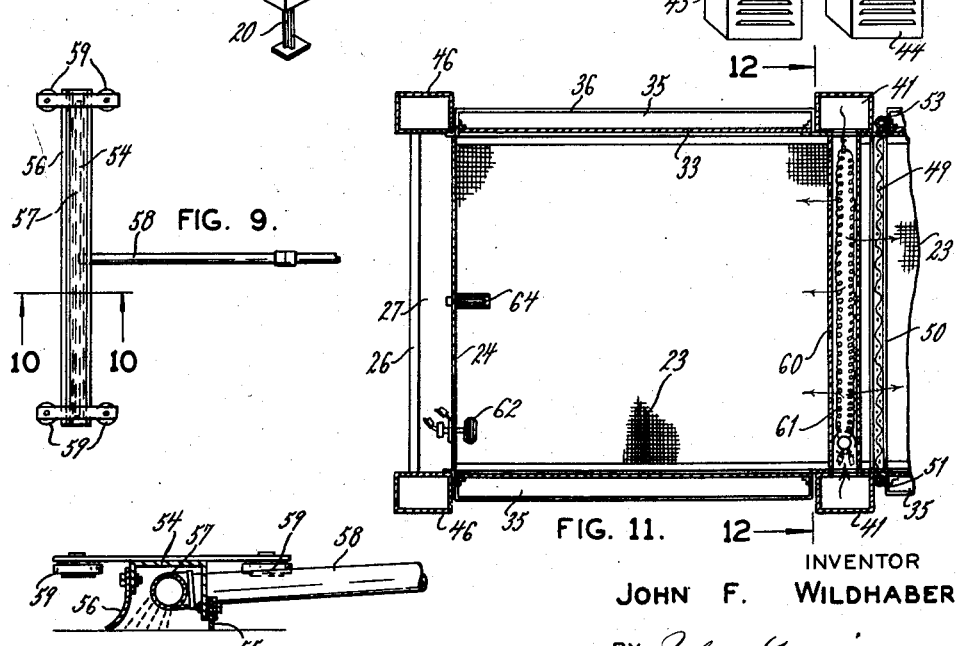
FIG. 9.
FIG. 10.
FIG. 11.
INVENTOR
JOHN F. WILDHABER
BY John Cassidy
ATTORNEY Feb. 22, 1955 J. F. WILDHABER 2,702,503
POULTRY BATTERY
Filed Nov. 30, 1949 3 Sheets-Sheet 2
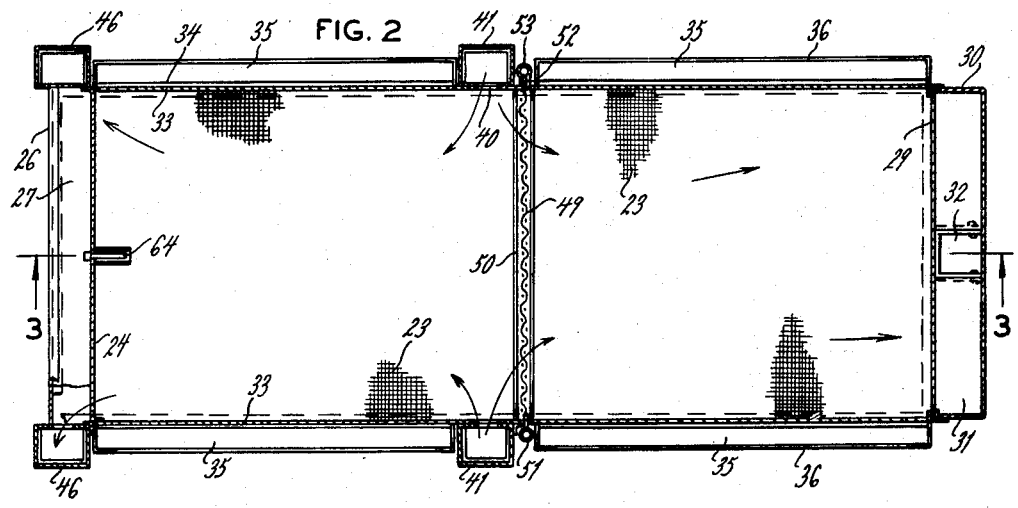
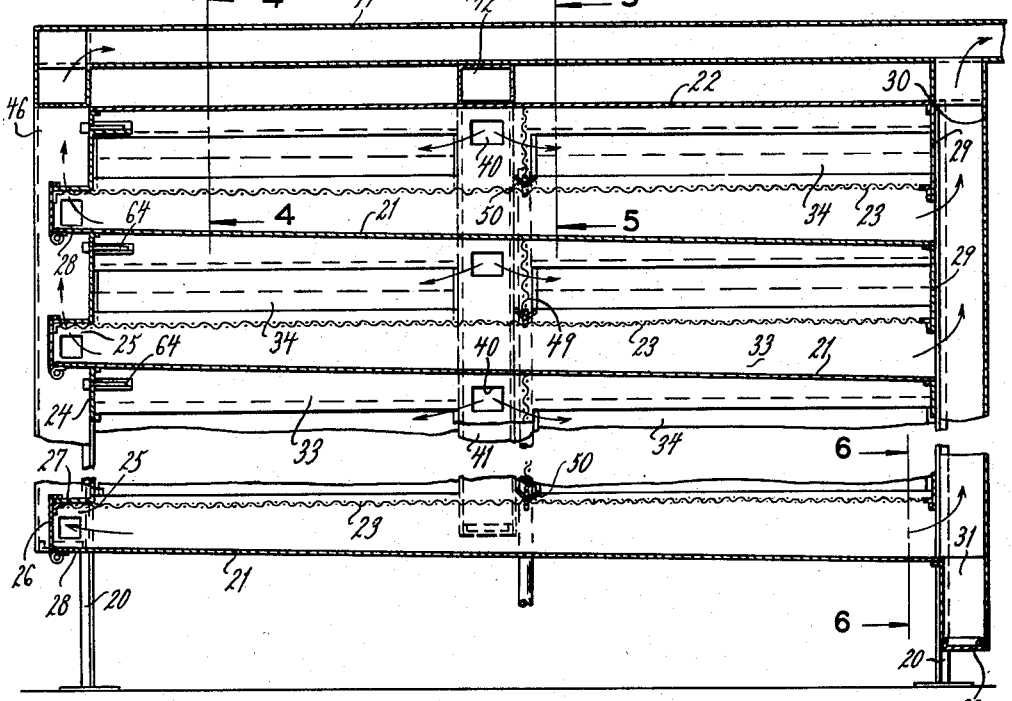
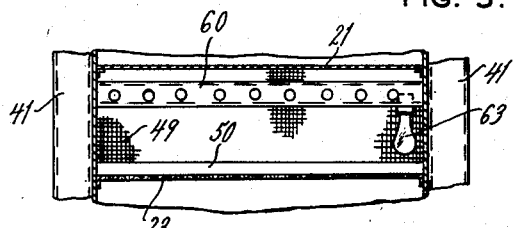
INVENTOR
JOHN F. WILDHABER
BY
ATTORNEY Feb. 22, 1955  J. F. WILDHABER  2,702,503
POULTRY BATTERY
Filed Nov. 30, 1949  3 Sheets-Sheet 3
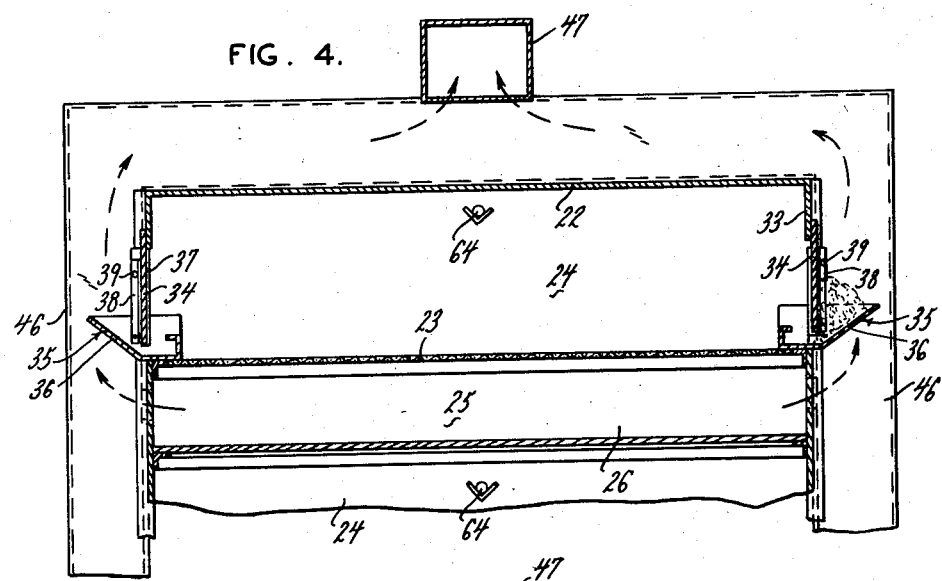
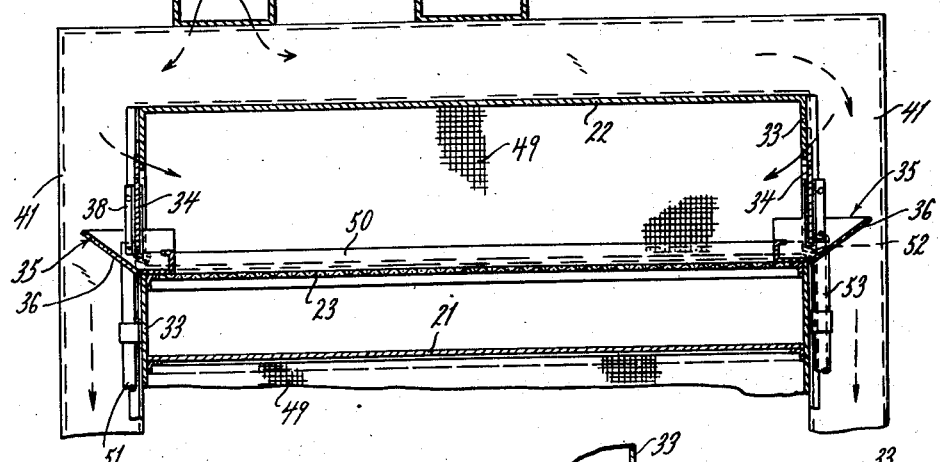
INVENTOR
JOHN F. WILDHABER
BY
ATTORNEY United States Patent Office 2,702,503
Patented Feb. 22, 1955

POULTRY BATTERY

John F. Wildhaber, St. Louis, Mo.

Application November 30, 1949, Serial No. 130,231

3 Claims. (Cl. 98—33)

This invention relates to poultry batteries; that is, coops arranged in tiers for confining poultry in starting, as brooders, and in finishing to commerical age and size. It is particularly adapted to chickens, but may be successfully used with other poultry, such as guineas, and with game including quail and pheasants.

A summary of the invention and of a preferred embodiment will assist in understanding the invention. The poultry battery embodying the present invention includes a tier of superimposed rectangular coops, each having a floor area of approximately twenty square feet. The coops are substantially closed except for their communication with air ducts leading to and from the coops. A blower fan takes air from the surrounding atmosphere and forces it through one duct or conduit (or pair of conduits) to the coops, while an exhaust fan removes air from the coops through another duct or conduit (or set of conduits).

Air introduced into the coops, if the weather is other than moderate, is heated or cooled by appropriate heat exchange devices to bring it to an ideal temperature as it is introduced into the coops.

A particular arrangement of the air ducts and their openings into and from the coops is preferred. Each coop is divided by a central screen partition extending from side to side of the coop into two communicating compartments. Each coop has an imperforate floor and a screen decking raised substantially above the floor. Conduits introducing air into the coops are arranged vertically as a pair centrally on each side of the tier and opening into the coops substantially above the screen decking at approximately breathing level or above. The conduits for exhausting the air are arranged at each end of the tier and communicate with the coops at openings between the decking and the floor of each coop.

A supply of feed for the poultry serves as a closure for the coops by means of a novel construction, presently summarized. The physical elements of the battery serve to substantially close the coops, except for their communication with the air conduits, and except for horizontal slits in the sides of the coops below panels in side walls. A feed trough is positioned in each slit below the panel with an outer wall extending above the bottom edge of the panel. Thereby feed in the trough will extend above the bottom of the panel and close the slit.

Special novel means have been provided for cleaning the floor because of its unusual position, and other difficulties. A removable cap covers the opening at one end of the coop between the decking and the floor. A cleaning device, adapted to be inserted in this opening, includes a frame, a scraper, a squeegee and a water sprayer, the scraper and squeegee being arranged laterally on the frame with the sprayer therebetween. A hollow handle attached to the frame provides for its manipulation and, being connected with the sprayer, forms a conduit therefor. Rollers are secured to the ends of the frame for engaging the sidewalls of the coop, thereby facilitating its use.

When the battery is to be used as a starter or brooder, novel means are provided for maintaining, within small variations, an accurate and high predetermined temperature in the coops. A perforate jacket is provided in each coop to receive air from the conduit introducing fresh air. An electric heating element is positioned in the jacket and is under the control of a thermostat in the coop.

This invention provides for the raising of poultry of the highest quality with the highest profit. Each coop is isolated so that disease cannot spread from coop to coop. Ideal climatic conditions are maintained. The fowls, being isolated, are not disturbed or excited so that they grow under sedentary conditions. Amazing results have been obtained in shortening the maturity period, in producing fowls with minimum of loss or offal in dressing, and in high meat-feed ratio. The quality of the meat is superior.

The following detailed description of a preferred embodiment of the invention, taken in connection with the accompanying drawings will give a complete understanding of the invention and the best method of applying it.

Fig. 1 is a perspective view of a battery embodying the present invention, with parts of the appurtenant system shown diagrammatically;

Fig. 2 is a horizontal section through the battery on line 2—2, Fig. 1;

Fig. 3 is a vertical section on line 3—3, Fig. 2;

Fig. 4 is a vertical section on line 4—4, Fig. 3;

Fig. 5 is a vertical section on line 5—5, Fig. 3;

Fig. 6 is a vertical section on line 6—6, Fig. 3;

Fig. 7 is a vertical section showing details of a side panel with its environment;

Fig. 8 is a horizontal section on line 8—8, Fig. 7;

Fig. 9 is a plan view of a clean-out device;

Fig. 10 is a vertical section on line 10—10, Fig. 9, showing details of the clean-out device;

Fig. 11 is a horizontal section showing a modification to adapt the battery as a starter or brooder; and Fig. 12 is a vertical section on line 12—12, Fig. 11, showing details of the brooder.

*Battery unit construction*

Each battery includes a plurality of superimposed coops (four, as shown in the drawings). The battery is supported by four vertical angle members 20, which form a part of the frame, the frame being constructed of angle members suitably arranged, which need not be described in detail.

Each coop has a floor 21, which also serves as a dropping board and as a top wall for the coops immediately below it, except, of course, in the case of the bottom coop. The top coop has a top wall 22. To secure drainage in cleaning, the floor members 21 slope to the rear. For facility in description, the near end, Fig. 1, may be considered the front and the far end, the rear.

Screen decking 23 is spaced a substantial distance above the floor; a distance of four inches to six inches has been found satisfactory, four inches at the front end and six inches at the rear end.

On the front end each coop is faced by a plate 24 which covers the space between the screen decking 23 and its top wall 21 (or 22, in the case of the top coop).

The space between the screen decking 23 and the floor or dropping board 21 has a vestibule 25, which is closed by a removable cap 26. The vestibule 25 is formed with a top wall 27 and a bottom wall 28; the top wall 27 preferably being integral with the adjacent end plate 24, and the bottom wall being an extension of the dropping board 21.

Obviously, the rear end may be finished in the same manner as the front end. However, for convenience in cleaning, a different construction is provided. The space between the screen decking 23 and the top of the coop is covered by a plate or panel 29 (Fig. 3). A hood 30, with a vertical wall spaced from the rear of the coops, covers the entire rear end of the battery. It is open to the spaces below the screen decking and serves a dual purpose: as a collector or manifold for exhausting air from the coops, and as a hood to confine and direct droppings and wash water from the dropping boards. The bottom of the hood 30 has a funnel 31 with its opening closed by a removable cap 32.

The sides of the battery are closed in part by fixed panels 33 and removable glass panels 34. The arrangement is such that a horizontal slit or rectangular opening is left between the bottom edge of the glass panel 34 and the top edge of the adjacent panel 33. In this slit or opening, a feed trough 35 is positioned. This trough has its outer wall 36 so proportioned that it extends above the bottom edge of the glass panel 34. Thus, when the trough 35 is filled, the opening or slit below the glass panel is closed.

It may now be stated, and understood, that each coop is substantially closed structurally except for the slit below the glass panel (or within the feed trough), and for communication with air conduits, later to be explained in more detail.

The means for providing movability or removal of the glass panels 34 is shown in Figs. 7 and 8. Fixed vertical angle members 37 form seats for the panel, with pivoted bars 38, each fastened by a removable pin 39, clamping the panel therebetween.

Air conditioning system

Air is introduced into each coop through separate openings 40 in vertical ducts 41, located centrally along the two sides of the battery and connected with a supply conduit 42. The openings 40 are substantially above the wire decking 23 and may be said to be at the breathing level, or above.

A blower 43 takes air from surrounding atmosphere, preferably outside air, after it has been conditioned as to temperature, when required, by a heater 44, or a cooler 45. It may be understood the heating and cooling devices may be of any convenient character. They should be such as to sufficiently heat the air in cold weather, and to cool the air in hot weather. In mild weather, when the outside temperature is such that it is favorable to best growing conditions (especially when the battery is used for finishing) the heat exchanges are unnecessary.

It may also be understood, without specific description or showing, that air filters may and should be employed across inlets to the air introduction system.

An air exhaust system is provided with communication from the ends of each coop below the screen decking 23. Thus, the air enters at the longitudinal center of the coop at about the breathing level, and is removed from the ends below the screen decking, or at the feet of the fowl.

At the front end, exhaust vertical ducts 46 communicate with the sides of the vestibules 25. These ducts are connected with an exhaust conduit 47, through which air is drawn by an exhaust fan 48, and thereby discharged to the outside atmosphere.

The hood 30, communicating with the coops at the spaces between the decking and the floor, forms an exhaust manifold for the rear end of the battery. It is connected at its top to the exhaust conduit 47.

It may now be stated and understood that air is continuously supplied under pressures separately to each coop, and that air in the coops is continuously exhausted from the coops, while the coops are substantially closed except for their communication with conduits or ducts of the air system. Because the blower and the exhaust fan operate simultaneously, the air is maintained in the coops at about atmospheric pressure. Therefore, while tight construction is desirable, the joints need not be hermetically sealed or specially caulked. It has been demonstrated that disease will not spread from coop to coop under these conditions.

Each coop has a rectangular floor area preferably of approximately 20 square feet. A dimension of 30 inches by 8 feet has been found quite satisfactory. This area may, of course, be varied considerably to suit individual preferences or special conditions.

The coops are divided each into two separate communicating compartments by a vertical wire partition 49 in the center of the coop. This segregates the fowl into two groups which prevents injury by crowding, due, for instance, to sudden fright in the flock.

A water trough 50 is placed below the screen 49, accessible to fowl on each side of the screen. This trough is supplied by running water from a line 51 on one side of the battery, while overflow connections 52 conduct water therefrom to a waste pipe 53.

Cleaning apparatus

A device illustrated in Figs. 9 and 10 is provided for easy and efficient cleaning of the dropping boards 21. This device is intended to be inserted in a vestibule 25, after its cap 26 has been removed, and pushed from front to rear. It includes a frame 54 which supports a flexible scraper or squeegee 55 and a rigid scraper or blade 56, with a water sprayer 57 therebetween. The sprayer 57 comprises a perforate pipe, which has a T connection with a hollow handle 58, by which the cleaner is pushed and manipulated, and through which water under pressure may be supplied to the sprayer.

Rollers 59 are mounted on the end of the frame 54 and guide the cleaner by contact with the side walls or panels 33.

Brooder modification

While the battery is to be used in starting the fowls, or as a brooder, additional elements are provided to maintain an accurate predetermined temperature, as illustrated in Figs. 11 and 12.

A horizontal tubular perforate jacket 60 extends across the coop centrally between the vertical air inlet ducts 41 and is connected at each end to one of the ducts. An electric heating element 61 is positioned inside the jacket 60 and controlled by a thermostat 62, positioned on an end wall of the coops. Preferably, a signal light 63 is connected in circuit with the heating element so that an attendant may observe any unusual conditions. A thermometer 64 may be provided in each coop by which the temperature can be checked readily.

Operation

The operation of the device will be more or less apparent from the foregoing description. It is contemplated that several batteries may be placed in one room and supplied by a single air system. The air, as heretofore stated, should be taken from the outside, filtered and then heated or cooled as conditions require. Air exhausted from the batteries is wasted to the outside atmosphere, at a point remote from the intake, so that the incoming air will no be contaminated.

The blower and exhaust fan are operated continuously, thereby maintaining approximately atmospheric pressure in the coops. Under these conditions there is no danger of spread of disease from one coop to another, even if the joints in the coops are not hermetically sealed. It also permits feed in the feed troughs to act as a closure for the coops.

A battery modified as shown in Figs. 11 and 12 is used for starting the fowl and when they require a high and accurate temperature. Air is heated to near the temperature required by the system heater 44, and is then brought up to the required level by the individual heating elements 61, under the control of thermostats 62.

After the fowls have attained an age where high and accurate temperature is not required they are transferred to the finishing battery, as shown in Figs. 2 to 8. As indicated above, as and when weather conditions require, the incoming air is heated and cooled to a temperature that will best promote growth and development.

The invention provides advantages in several respects, which taken together have produced remarkable results. The health of the flock is protected against infection. It is apparent, of course, that disease in one coop is free to spread to all members in the coop, but otherwise it is isolated. Since all air supplied to the coops is filtered outside air, there is little danger of infection from that source. Practically, disease must be introduced by way of a diseased fowl when placed in the coop, or by infection on the infrequent occasions when the side panels are opened. Even when the dropping boards are being cleaned, the air currents are sufficient to prevent infection from entering the coop.

The closed construction of the coops with the efficient air conditioning make it easy to maintain ideal climatic conditions in the coop. Growth is stimulated and losses prevented by the quiet which is maintained by the closed coops. Fowl are susceptible to excitement and fright from unusual noises, which cause them actual injury as well as slowing their growth. It is submitted, therefore, that the invention is beneficial by reason of isolation from disease, maintaining ideal climatic conditions, and keeping the fowls in a quiescent state.

To clean the dropping boards, the cap 26 of a vestibule 25 is removed and the cleaning device is inserted therein. It is so arranged that the boards may be cleaned quickly and readily, the droppings and wash water are passed to the rear end, where it drops through the hood 30 and to the funnel 31, from which it may be wasted, after removal of the cap 32, by passing into a drainage trough or sewer pipe.

The battery has been found most efficient in bringing chickens to maturity. The well known varieties, White Rocks and New Hampshire Reds, have been brought to market maturity, with a live weight of two and one-half to three pounds, in the unprecedented time of six weeks. The feed consumed has been lower than is obtainable by any other growing equipment known to the applicant. The offal in dressing has been the lowest. The flesh of the chickens has been superior.

Favorable results have been obtained with guineas. The same favorable results have not been obtained with turkeys since the food flavor did not appear to be the highest. However, with different feed, better results might be obtained with this fowl. Quail has been raised satisfactorily, and it is assumed pheasants and other game and fowl can be successfully matured in the equipment.

Various changes may be made in the details of construction, within the scope of the appended claims, without departing from the spirit of the invention; parts of the invention may be used without the whole; and improvements may be added while retaining the benefits of the invention.

I claim:

1. A poultry battery comprising a tier of superimposed separate coops, each coop having an imperforate floor and a screen decking above said floor, said floors of the coops sloping downward toward one end of the battery, said end having outlets at the level of each floor to receive the droppings from the floors, a hood on said end enclosing the outlets and having a lower end portion formed with an outlet opening, closure means for said outlet opening, an exhaust conduit connected to the upper end of the hood, an exhaust fan connected to said exhaust conduit for exhausting air from each coop through the outlets in the end and for venting the hood, vertical air inlet conduits disposed alongside the sides of the battery and having outlets opening individually into each coop above the screen decking, a fan connected to said air inlet conduits for taking air from the surrounding atmospheres and passing it through the air inlet conduits to the coops, each coop being substantially closed against air flow thereto or therefrom except for communication with said conduits, doors in said coops at the upper ends of the floors for admission of a cleaning implement and wash water to move downward on the floors.

2. A poultry battery as claimed in claim 1, wherein said air inlet conduits are disposed substantially centrally between the ends of the battery, said battery having its other end at the upper ends of the floors provided with air outlet openings at the level of the floors, exhaust conduits extending transversely of such end and communicating with the air outlet openings, and a U-shaped header having its leg portions disposed vertically and connected to the ends of the transverse exhaust conduits and its web portion connected to the exhaust conduit.

3. A poultry brooder comprising a tier of superimposed coops, a perforated tubular air jacket in each coop for introducing air into the coop, an air conduit communicating with said jackets, a fan arranged to force air through said conduit and into said jackets and thereby into the coops, a heater arranged to heat air introduced into said conduit, a heating element in each of said jackets, a thermostat in the coop for controlling the heating element, and a conduit for exhausting air from the coops, said coops being substantially closed against air flow thereto or therefrom except for communication with said conduit.

References Cited in the file of this patent

UNITED STATES PATENTS

| | | |
|---|---|---|
| 1,381,266 | Andrews | June 24, 1921 |
| 1,410,632 | Welch | Mar. 28, 1922 |
| 1,448,149 | Pennington | Mar. 13, 1923 |
| 1,823,584 | Bruce | Sept. 15, 1931 |
| 1,841,957 | Kelly | Jan. 19, 1932 |
| 1,936,326 | Carson, Jr. | Nov. 21, 1933 |
| 1,936,978 | Casey | Nov. 28, 1933 |
| 1,981,051 | Leeuw | Nov. 20, 1934 |
| 2,137,996 | Crawford | Nov. 22, 1938 |
| 2,294,025 | Dagg | Aug. 25, 1942 |
| 2,335,173 | Corey | Nov. 23, 1943 |
| 2,383,326 | Lovell | Aug. 21, 1945 |
| 2,436,095 | Brossia | Feb. 17, 1948 |